Figure 1:
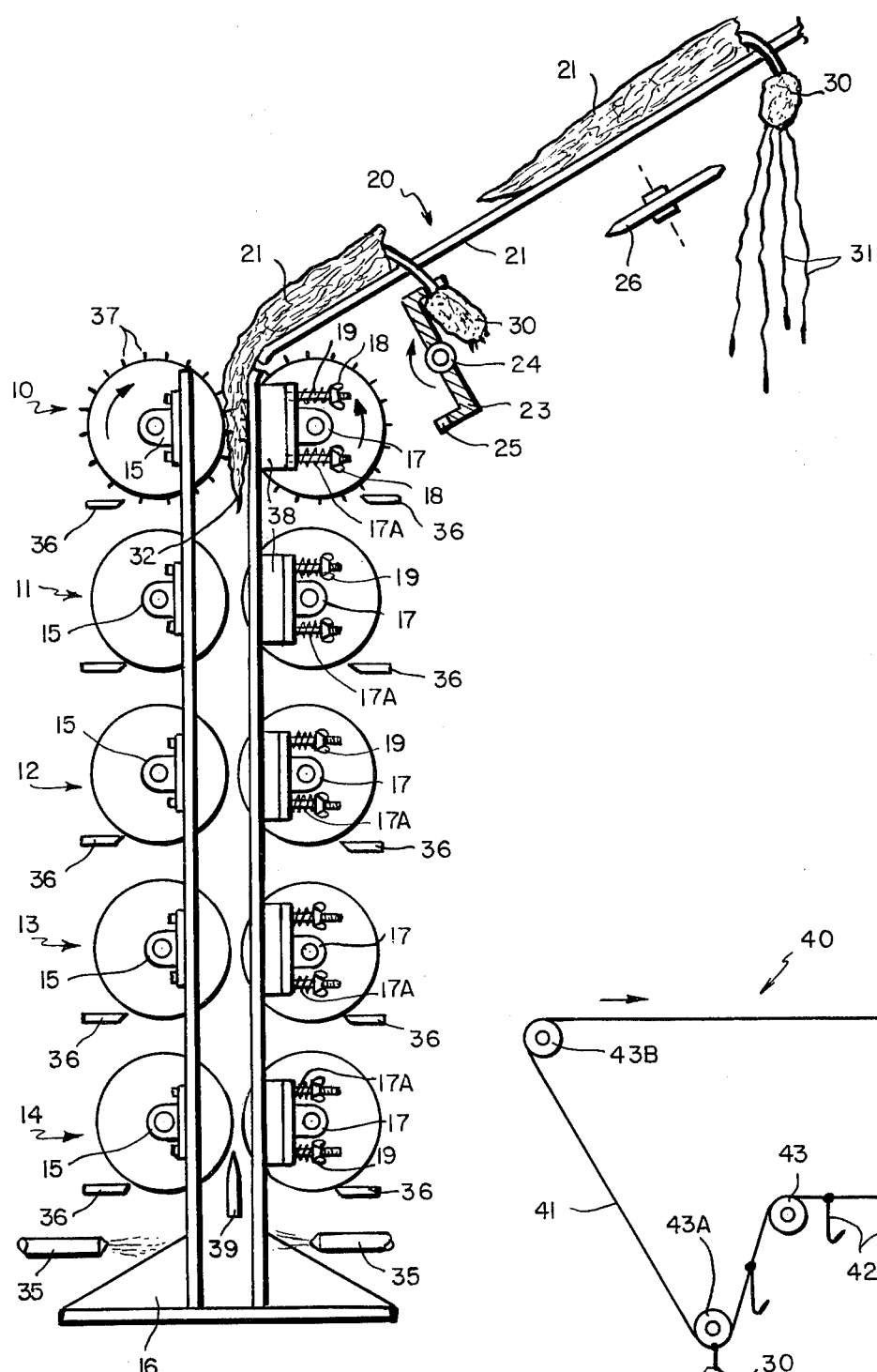

United States Patent [19]
Berk

[11] 3,947,921
[45] Apr. 6, 1976

[54] APPARATUS FOR CLEANING MARINE ANIMALS OF THE MOLLUSK TYPE

[75] Inventor: Zeki Berk, Lexington, Mass.

[73] Assignee: Massachusetts Institute of Technology, Cambridge, Mass.

[22] Filed: June 18, 1973

[21] Appl. No.: 370,998

[52] U.S. Cl.......................................... 17/71; 17/60
[51] Int. Cl.² .......................................... A22C 29/00
[58] Field of Search ............... 17/58, 59, 60, 53, 13, 17/24, 44.1, 71

[56] References Cited
UNITED STATES PATENTS

| | | | |
|---|---|---|---|
| 710,912 | 10/1902 | Farmer .................................. | 17/58 |
| 1,539,300 | 5/1925 | Christiansen .......................... | 17/60 |
| 2,839,781 | 6/1958 | Jarvis.................................... | 17/44.1 |
| 3,020,583 | 2/1962 | Lapeyre et al......................... | 17/71 |
| 3,453,684 | 7/1969 | Heck...................................... | 17/60 |
| 3,460,192 | 8/1969 | Marvin et al. ......................... | 17/53 |

FOREIGN PATENTS OR APPLICATIONS
503,752   1951   Belgium................................ 17/60

*Primary Examiner*—Richard C. Pinkham
*Assistant Examiner*—William R. Browne
*Attorney, Agent, or Firm*—Arthur A. Smith, Jr.; Martin M. Santa; Robert Shaw

[57] ABSTRACT

An apparatus for eviscerating a marine animal of the mollusk type, such as a squid, wherein the head region of the squid is appropriately held and a gradually increasing pressure is applied to the body thereof as the head and body are relatively moved in opposite directions from each other, whereby the head and attached viscera are readily and cleanly removed from the body. The marine animals are held to the conveyor during the time of removal of the head and viscera by power driven pressure rollers. The power driven rollers advance the marine animals in the direction of movement of the conveyor.

16 Claims, 2 Drawing Figures

APPARATUS FOR CLEANING MARINE ANIMALS OF THE MOLLUSK TYPE

The invention herein described was made in the course of work under a grant from the United States Department of Commerce, National Oceanic and Atmospheric Administration.

This invention relates generally to apparatus for cleaning marine animals and, more particularly, for eviscerating and removing the skin from mollusks such as squid, cuttlefish and related types of marine animals.

BACKGROUND OF THE INVENTION

Marine animals of the mollusk type, such as squid, cuttlefish, and the like, are used extensively as raw materials for the manufacture of various processed foods, particularly in the Far Eastern, South American, and Mediterranean regions of the world. In order to prepare the mollusk properly for such processing the inedible parts thereof, such as the head and viscera attached thereto, must be cleanly removed. In many applications it may further be necessary, or desirable, to remove the outer skin thereof.

DESCRIPTION OF THE PRIOR ART

At the present time the cleaning of such marine animals is carried out by manual operations. Thus, the head of the mollusk is manually removed by a knife and the body of the mollusk split open to expose the internal organs. The latter are then scraped out for disposal and, if necessary, the skin is further scrapped off manually by use of the knife or other suitable scraping instrument. Such a manual operation is both time-consuming and labor-consuming so that the overall operation is both slow and relatively high in cost.

DESCRIPTION OF THE INVENTION

In accordance with the invention the removal of the inedible parts can be performed more efficiently from the view-point of of both cost and time by the use of an apparatus in which means are utilized to hold the mollusk at the head region thereof and further means are utilized to apply pressure to the body thereof. The head and body are relatively moved in opposite directions with respect to each other simultaneously with the application of pressure to the body which pressure is preferably gradually increased as the head and body are displaced from each other, whereby the head portion and the internal organs attached thereto are all readily and cleanly removed from the body.

In one embodiment of the invention, the mollusk is fed through one or more pairs of oppositely disposed rollers, the mollusk being inserted tail first between the rollers. As the mollusk is conveyed to and carried through the rollers, the head region is held at a position external thereto by appropriate holding means, such as a hook. The rollers are arranged to apply increasing pressure to the mollusk body as the latter is moved in a direction away from the externally retained head so that the head and attached internal organs are efficiently removed.

In some applications the rollers can be arranged so that as the eviscerated mollusk body travels therethrough the outer skin becomes loosened and is readily removed as by a mechanical scraper means or by the use of pressurized fluid jets at or near the exit end of the rollers.

Figure 2:
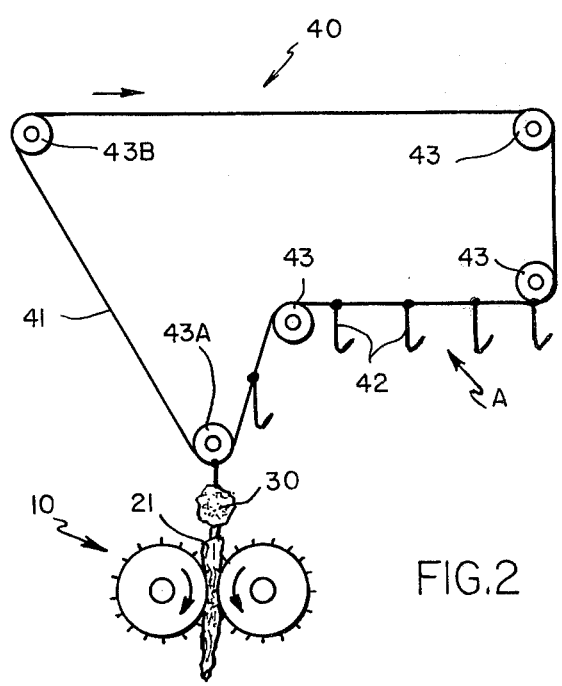

The invention can be described in more detail with the help of the accompanying drawings wherein FIG. 1 shows in diagrammatic form one embodiment of the invention; and FIG. 2 shows an alternative embodiment for the conveying means of the invention.

As can be seen in the specific embodiment of FIG. 1, a plurality of rollers are arranged in a series of oppositely disposed roller pins 10, 11, 12, 13 and 14 which are vertically mounted with respect to each other. The shafts of the rollers at the left as shown in FIG. 1 are appropriately journalled in mounting means 15 which are fixedly attached to one side of vertical frame member 16. The shafts of the rollers at the right as shown in FIG. 1 are journalled in mounting means 17 which are spring-mounted to the opposite side of frame member 16. The tension of each of the springs 17A is made adjustable by the use of wing nuts 18 which are threadably movable on threaded studs 19 affixed to frame 16. Accordingly, the pressure between the rollers can be adjusted at each pair as desired.

A conveyor means 20 which, in the specific embodiment shown, is in the form of a slanted chute 21, is mounted at an inclined angle with respect to the vertical frame member 16 so that mollusks 21, such as squids, placed thereon are fed by gravity toward the entrance pair of rollers 10. In the embodiment shown the slimy surface of the squid, together with the smooth surface of the chute, permits relatively easy and continuous gravity feed of squids placed thereon.

A rotating hook member 23 is mounted on a shaft 24 so as to rotate in a substantially clockwise direction in the figure. The hook member in the particular embodiment shown has two arms, each of which has an appropriate slot 25 therein for hooking on to the region of the squid just below the head thereof. A circular rotating knife 26 is rotatably mounted below conveyor chute 21 at a location displaced from rotating hook member 23 so as to encounter the squid at a point prior to the hooking process.

In operation the squids are loaded onto conveyor chute 21 so that the heads 30 and tentacles 31 thereof are arranged to dangle either from the side of chute 21 as shown, or through an appropriate slot placed therein, so as to hang below the chute. As each squid passes circular knife 26, the knife effectively slices off the major portion of the tentacles. Since the tentacles are often included in the edible products they may be appropriately collected for subsequent processing.

As the squid moves down the chute toward rotating hook member 23 the head region 30 thereof is caught in the slot of the hook at a point generally below the head itself as the tail region 32 thereof is inserted between and moved through the entrance pair of rollers. The rollers are driven by suitable means (not shown) to rotate in opposite directions as shown by the associated arrows so as the cause the squid to move vertically downward between the upright sides of frame member 16.

The spring-mounted rollers are suitably adjusted so as to apply a gradually increasing pressure to the body of the squid as the head is moved in a direction away from the rollers by hook member 23. The relative motion in opposite directions of the body of the squid and the head thereof, together with the simultaneous application of gradually increasing pressure to the body, causes the head and internal organs attached thereto to be readily and cleanly removed from the squid body.

The preceeding phrase "in opposite directions " is interpreted to mean in diverging directions. The removed head and viscera can be collected in any appropriate manner for subsequent disposal.

The squid then continues to move further downwardly through the successive roller pairs. To enhance the pulling action on the squid body by the roller pairs, each successive pair of rollers may be rotated in a preferred embodiment at a peripheral velocity which is higher than that of the preceding pair. The gradually increasing pressure between each successive roller pair causes the pen of the squid to be removed from the mantle and the skin to become loosened. At the output side of the exit pair of rollers, the loosened portions of the skin are removed by jet means 35, which apply one or more jets of liquid, such as water, under pressure against the skin as it passes through the exit pair of rollers.

If it is desired to cut the mantle, either longitudinally or transversely, an appropriate knife 39 is mounted between and externally to the last pair of rollers as shown.

Each of the rollers may have associated therewith a doctor blade 36 which tends to prevent the squid from wrapping around the rollers as it moves through the apparatus and also keeps the roller surfaces relatively clean. In order to enhance the overall operation, one or more of the rollers may be fitted out with a plurality of studs 37 which project outwardly from the surface of the roller, as shown with reference to entrance roller pair 10.

In one particular embodiment of the invention of the multiple roller type as shown in FIG. 1, the peripheral speeds of the five roller pairs can be arranged, for example, so that the ratio of speeds between the first and second pair is 9:10, between the second and third pair is 10:12, between the third and fourth pair is 10:14, and between the fourth and fifth pair is 14:18. Thus, for an apparatus using rollers having a diameter of 72 mm., for example, speeds of 80 r.p.m., 89 r.p.m., 107 r.p.m., 150 r.p.m. and 193 r.p.m. from the top input roller pair to 10 to the bottom exit roller pair 14, respectively, can be used for satisfactory operation.

The pressures between the rollers of each pair are arranged to increase gradually by appropriately adjusting spring members 17A, the gradually increasing pressures being such as to produce the desired evisceration without damage to the ink sac of the mollusk. As further shown in the embodiment of FIG. 1 a spacer means 38 is provided at the spring-mounted roller of each pair to provide a minimum clearance between the oppositely disposed rollers of each pair. In a specific embodiment such minimum clearance is set at 8 mm., 6 mm., 4 mm., 4 mm., and 4 mm. from the top roller pair to the bottom roller pair, respectively. In the five roller-pair arrangement the first three rollers generally provide the required pressure increase and movement of the squid body to produce effective evisceration while the remaining two rollers further serve to loosen the skin of the squid so that it can be removed at the exit end thereof. If the skin does not require removal, the latter two rollers may be omitted in such application.

An alternative method of conveying the squid to the entrance pair of rollers is shown by the conveying means 40 depicted in FIG. 2. As seen therein, an endless conveyor belt 41 has attached thereto a plurality of hook members 42 (only an exemplary few of which are shown in the figure), the belt rotating in a generally clockwise direction around pulleys 43 at least one of which is driven in a suitable manner (not shown) for such purpose. The head regions of the squid are hooked on to hook members 42 at appropriate point A, the squids then being conveyed toward the entrance pair of rollers 10. As the tail region of each squid passes by the rollers under pulley 43A, it is inserted between such rollers so that the body of the squid is pulled downwardly through the rollers in a manner similar to that discussed above with reference to FIG. 1. The head end and the attached viscera are then moved upwardly away from the squid body in the general direction of pulley 43B, and the squid is thereby eviscerated as before. The tentacles may be removed in an appropriate manner prior to hooking the squid onto hook member 42 or a circular knife may be appropriately mounted adjacent the conveyor to remove them as they are conveyed toward the roller arrangement.

While the roller pairs are shown mounted vertically in the embodiments discussed above, they can also be mounted horizontally or at any inclined angle as desired. Further, other means than the specific roller pair arrangement discussed above may be devised to move the squid body away from the head region and to gradually apply pressure to the body in accordance with the scope and principles of the invention. Accordingly, the invention is not to be construed as limited to the specific embodiments shown and discussed above except as defined by the appended claims.

What is claimed is:

1. Apparatus for cleaning marine animals of the mollusk type comprising
   means for holding said animal at the head region thereof;
   means for applying pressure to the body of said animal;
   means for relatively moving said head region and said body in opposite directions substantially simultaneously with the application of said pressure;
   whereby the head portion and internal organs of said marine animal are substantially completely removed from the body thereof, said pressure applying means including at least one pair of rollers between which said body is inverted; and
   wherein said moving means includes means for rotating said rollers so that said body is moved in a direction away from said holding means.

2. Apparatus in accordance with claim 1 wherein said holding means comprises a hook means for holding said head; and
   means for moving said hook means in a direction away from said rollers.

3. Apparatus in accordance with claim 1 and further including means for conveying said marine animals toward said roller means so that the tail regions of said marine animals are first inserted between said roller means.

4. Apparatus in accordance with claim 1 wherein said pressure applying means includes a plurality of roller pairs;
   means for rotating said plurality of roller pairs so as to move the body of said marine animal therethrough, said rotating means including means for rotating each successive roller pair at a peripheral velocity which is greater than the peripheral velocity of its preceding roller pair.

5. Apparatus in accordance with claim 4 and further including means for gradually increasing the pressure upon the body of said marine animals as said body moves through said successive roller pairs.

6. Apparatus in accordance with claim 5 wherein said gradually applied pressure tends to loosen the skin of said animal and further including means for removing the loosened skin at the exit end of said successive roller pairs.

7. Apparatus in accordance with claim 6 wherein said skin removing means comprises at least one means for applying a jet of fluid under pressure against said loosened skin.

8. Apparatus in accordance with claim 4 wherein said successive roller pairs are mounted substantially vertically; and further including
conveying means comprising a chute mounted at an inclined angle with reference to said vertical roller pairs whereby said marine animals placed thereon are conveyed toward said entrance pair of rollers.

9. Apparatus in accordance with claim 4 wherein said roller pairs include first, second and third roller pairs arranged in series, the peripheral velocities thereof being arranged so that ratio of the peripheral velocity of the first roller pair to that of the second roller pair is 9:10 and the ratio of the peripheral velocity of the second roller pair to that of the third roller pair is 10:12.

10. Apparatus in accordance with claim 9 and further including fourth and fifth roller pairs arranged in series with said first, second and third roller pairs, the peripheral velocities thereof being arranged so that the ratio of the peripheral velocity of said third roller pair to that of said fourth roller pair is 10:14 and the ratio of the peripheral velocity of the fourth roller pair to that of the fifth roller pair is 14:18.

11. Apparatus in accordance with claim 4 wherein the rollers of each of said plurality of roller pairs have a fixed minimum clearance.

12. Apparatus in accordance with claim 11 wherein the fixed minimum clearances are progressively smaller from the input to the exit roller pairs.

13. Apparatus in accordance with claim 4 and further including knife means mounted at the exit pair of said successive roller means for slicing the mantle of said marine animal into at least two parts.

14. Apparatus in accordance with claim 1 wherein the oppositely disposed rollers of said roller pair have a fixed minimum clearance.

15. Apparatus in accordance with claim 1 and further including conveying means comprising an endless conveyor belt having a plurality of hooks attached thereto and adapted to receive the head regions of said marine animals, said endless conveyor belt conveying said animals to said pair of said rollers.

16. Apparatus in accordance with claim 1 and further including rotating circular knife means for removing portions of the tentacles of said marine animal.

* * * * *

UNITED STATES PATENT AND TRADEMARK OFFICE
CERTIFICATE OF CORRECTION

PATENT NO. : 3,947,921
DATED : April 6, 1976
INVENTOR(S) : Zeki Berk

It is certified that error appears in the above-identified patent and that said Letters Patent are hereby corrected as shown below:

Column 4, line 46, cancel "inverted" and substitute

---inserted---.

Signed and Sealed this

Fourteenth Day of September 1976

[SEAL]

Attest:

RUTH C. MASON
Attesting Officer

C. MARSHALL DANN
Commissioner of Patents and Trademarks